(12) United States Patent
Nagaoka et al.

(10) Patent No.: US 8,834,738 B2
(45) Date of Patent: Sep. 16, 2014

(54) FERRITE MAGNETIC MATERIAL

(75) Inventors: Junichi Nagaoka, Chuo-ku (JP); Takahiro Mori, Chuo-ku (JP); Hiroyuki Morita, Chuo-ku (JP); Yoshihiko Minachi, Chuo-ku (JP)

(73) Assignee: TDK Corporation, Tokyo (JP)

( * ) Notice: Subject to any disclaimer, the term of this patent is extended or adjusted under 35 U.S.C. 154(b) by 234 days.

(21) Appl. No.: 13/382,220

(22) PCT Filed: Jul. 2, 2010

(86) PCT No.: PCT/JP2010/061341
§ 371 (c)(1),
(2), (4) Date: Mar. 19, 2012

(87) PCT Pub. No.: WO2011/004773
PCT Pub. Date: Jan. 13, 2011

(65) Prior Publication Data
US 2012/0161062 A1    Jun. 28, 2012

(30) Foreign Application Priority Data
Jul. 8, 2009   (JP) ................. 2009-161930

(51) Int. Cl.
| | | |
|---|---|---|
| H01F 1/11 | (2006.01) |
| C01G 49/00 | (2006.01) |
| C04B 35/26 | (2006.01) |
| C01G 51/00 | (2006.01) |
| C04B 35/632 | (2006.01) |
| C04B 35/626 | (2006.01) |

(52) U.S. Cl.
CPC ....... *C04B 35/2633* (2013.01); *C04B 2235/448* (2013.01); *C01P 2006/12* (2013.01); *C04B 2235/605* (2013.01); *C04B 2235/727* (2013.01); *C04B 2235/785* (2013.01); *C01G 49/0054* (2013.01); *C04B 2235/767* (2013.01); *C04B 2235/3284* (2013.01); *C04B 35/2641* (2013.01); *C04B 2235/726* (2013.01); *C04B 2235/3215* (2013.01); *C04B 2235/72* (2013.01); *C04B 2235/6562* (2013.01); *C01G 51/006* (2013.01); *C04B 2235/85* (2013.01); *C01P 2002/30* (2013.01); *C04B 2235/3217* (2013.01); *H01F 1/11* (2013.01); *C04B 2235/447* (2013.01); *C04B 2235/3286* (2013.01); *C04B 2235/3224* (2013.01); *C04B 2235/3251* (2013.01); *C04B 2235/3206* (2013.01); *C04B 2235/3208* (2013.01); *C04B 2235/3279* (2013.01); *C04B 2235/661* (2013.01); *C04B 2235/3213* (2013.01); *C01P 2004/61* (2013.01); *C04B 2235/549* (2013.01); *C04B 2235/3281* (2013.01); *C04B 2235/32* (2013.01); *C04B 2235/3418* (2013.01); *C04B 2235/94* (2013.01); *C04B 2235/3239* (2013.01); *C04B 2235/5409* (2013.01); *C04B 2235/3232* (2013.01); *C04B 2235/95* (2013.01); *C04B 2235/3258* (2013.01); *C04B 2235/3287* (2013.01); *C04B 35/632* (2013.01); *C04B 2235/3293* (2013.01); *C04B 2235/3244* (2013.01); *C04B 2235/3409* (2013.01); *C04B 2235/3294* (2013.01); *C04B 2235/3227* (2013.01); *C04B 2235/3241* (2013.01); *C04B 2235/3262* (2013.01); *C04B 2235/786* (2013.01); *C04B 2235/3256* (2013.01); *C04B 35/6261* (2013.01); *C04B 2235/3277* (2013.01); *C04B 2235/5436* (2013.01); *C04B 35/6263* (2013.01); *C01P 2004/62* (2013.01); *C04B 2235/5445* (2013.01); *C04B 2235/3203* (2013.01)
USPC ..................................... 252/62.62; 252/62.63

(58) Field of Classification Search
USPC ................... 252/62.56, 62.62, 62.63
See application file for complete search history.

(56) References Cited

U.S. PATENT DOCUMENTS

| | | | | |
|---|---|---|---|---|
| 3,563,899 A * | 2/1971 | Coe | ............... | 2/62.63 |
| 3,846,323 A * | 11/1974 | Esper et al. | ................ | 252/62.63 |
| 2010/0108935 A1* | 5/2010 | Fujii et al. | .................. | 252/62.54 |

FOREIGN PATENT DOCUMENTS

| | | |
|---|---|---|
| JP | S50-041092 | 4/1975 |
| JP | S62-038532 | 2/1987 |
| JP | S62-260724 | 11/1987 |
| JP | 2008-270792 | 11/2008 |
| WO | 2008/126352 | 10/2008 |
| WO | WO 2008/126352 | * 10/2008 |

* cited by examiner

*Primary Examiner* — Carol M Koslow
(74) *Attorney, Agent, or Firm* — Drinker Biddle & Reath LLP

(57) ABSTRACT

An object of the present invention is to provide a ferrite magnetic material which can provide a permanent magnet retaining high Br and HcJ as well as having high Hk/HcJ. The ferrite magnetic material according to a preferred embodiment is a ferrite magnetic material formed of hard ferrite, wherein a P content in terms of $P_2O_5$ is 0.001% by mass or more.

9 Claims, 2 Drawing Sheets

FERRITE MAGNETIC MATERIAL

TECHNICAL FIELD

The present invention relates to ferrite magnetic materials, and more specifically to ferrite magnetic materials formed of hard ferrites.

BACKGROUND ART

Hard ferrites are known materials for permanent magnets composed of oxides. Ferrite magnetic materials composed of hard ferrites are provided as permanent magnets in the forms of ferrite sintered bodies and bond magnets. According to the recent miniaturization and advances in electronic components, a need is increasing for permanent magnets composed of ferrite magnetic materials which are miniaturized as well as have high magnetic properties.

Magnetic properties of permanent magnets are generally indicated by a residual magnetic flux density (Br) and a coercive force (HcJ), with high in those values being evaluated as high magnetic properties. In order to improve Br and HcJ of permanent magnets, various compositions of ferrite magnetic materials have been conventionally examined by adding certain elements to the magnetic materials.

In addition to have high Br and HcJ, permanent magnets are preferred to have a high ratio of a value of magnetic field when magnetization is 90% of Br (Hk) to HcJ (Hk/HcJ), so-called a squareness ratio. When Hk/HcJ is high, demagnetization due to external magnetic fields and temperature change can be decreased, and stable magnetic properties can be obtained.

In order to increase Hk/HcJ, the following Patent Literature 1 discloses a method for production of ferrite sintered magnets, wherein particles containing hexagonal ferrite as a main phase are ground to obtain powder for molding, which is a raw material for magnets, having a certain specific surface area at a certain grinding efficiency.

CITATION LIST

Patent Literature

Patent Literature 1: Japanese Patent Application Laid-open No. 2008-270792

SUMMARY OF THE INVENTION

Technical Problem

As described above, it is preferred for permanent magnets to have high Br, HcJ and Hk/HcJ. However, it is still difficult to obtain high values in these three properties. Thus, there has been a need for a ferrite magnetic material that can conveniently and sufficiently provide these properties.

With the foregoing in view, it is an object of the present invention to provide a ferrite magnetic material which can provide a permanent magnet retaining high Br and HcJ as well as having high Hk/HcJ.

Solution to Problem

In order to achieve the above object, the ferrite magnetic material of the present invention is formed of hard ferrite and characterized in that a P content thereof in terms of $P_2O_5$ is 0.001% by mass or more.

The ferrite magnetic material of the present invention is composed of hard ferrite and has sufficient Br and HcJ as to be permanent magnets. Due to the fact that the P content in terms of $P_2O_5$ is 0.001% by mass or more, it is possible to sufficiently retain Br and HcJ while obtaining high Hk/HcJ. It has been believed that, when magnetic materials contain a component other than ferrite, an increased amount thereof tends to undesirably affect magnetic properties. However, according to the present invention, inclusion of a certain amount or more P can surprisingly improve Hk/HcJ.

In view of improving the above effects, the P content of the ferrite magnetic material in terms of $P_2O_5$ is preferably 0.001 to 0.1% by mass, and more preferably 0.005 to 0.08% by mass.

Advantageous Effect of the Invention

According to the present invention, the ferrite magnetic material can be provided which can provide permanent magnets retaining high Br and HcJ while having high Hk/HcJ.

DESCRIPTION OF EMBODIMENTS

Preferred embodiments of the present invention are now described with reference to the figures. In the descriptions of figures, the same component is designated with the same symbol, and redundant illustrations are omitted.

(Ferrite Permanent Magnet)

Figure 1:
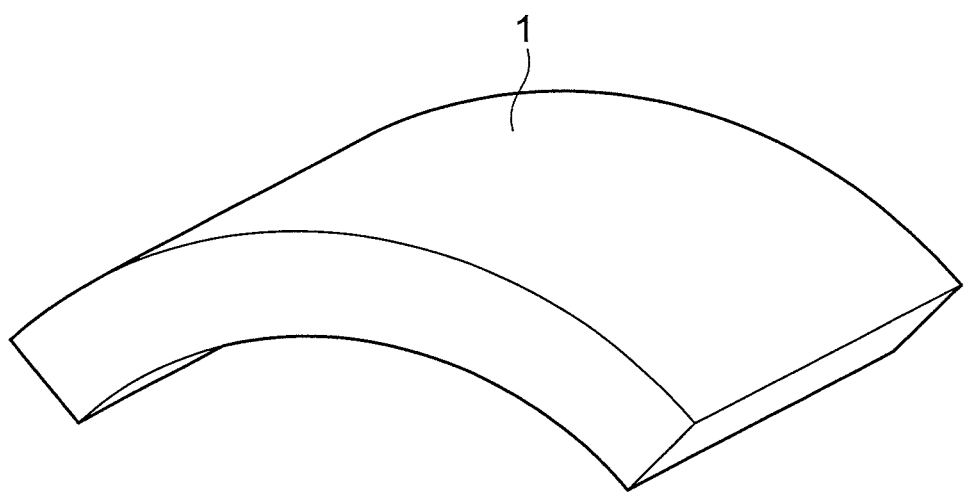
FIG. 1 is a perspective view of a ferrite permanent magnet according to a preferred embodiment.

FIG. 1 is a perspective view of a ferrite permanent magnet according to a preferred embodiment. The ferrite permanent magnet 1 (hereinafter merely referred to as "magnet 1") shown in FIG. 1 has an end face bent into an arc shape, i.e. it has a shape generally referred to as an arc segment shape, C-shape, tile shape, bow shape and the like. The magnet 1 is a ferrite sintered magnet composed of a sintered body of a ferrite magnetic material.

The ferrite magnetic material which constitutes the magnet 1 is composed of hard ferrite, and a P (phosphorous atom) content relative to the total components is, in terms of $P_2O_5$, 0.001% by mass or more. The magnet 1 having a P content satisfying the above requirement can have high Hk/HcJ. However, an increased P content may decrease Br and HcJ. Thus, the upper limit of the P content is desirably determined according to the desired Br and HcJ. In view of obtaining permanent magnets having Br, HcJ and Hk/HcJ commonly preferable therefor, the P content in terms of $P_2O_5$ is preferably 0.001 to 0.1% by mass, and more preferably 0.005 to 0.08% by mass.

The P content of the magnet 1 can be measured, for example, with an inductively coupled plasma optical emission spectrometer or by fluorescent X-ray quantitative analysis.

The ferrite magnetic material which constitutes the magnet 1 comprises hard ferrite as a main phase. Among crystal particles and grain boundaries formed therebetween constituting a ferrite sintered body, the main phase is, as used herein, the part constituting the crystal particles.

Hard ferrite constituting the ferrite magnet material generally has a hexagonal crystal structure and, when it is once magnetized with magnetic field, tends to retain a magnetization vector in the direction of the initial magnetization even after removal of the magnetic field. This hard ferrite is completely different from soft ferrite which generally has a spinel crystal structure and whose magnetization vector can be easily changed with application of magnetic field.

Hard ferrite may include M (magnetoplumbite)-type ferrites, W-type ferrites, X-type ferrites, Y-type ferrites, Z-type ferrites and the like. Among them, M-type ferrites are preferable because the effect for improving Hk/HcJ due to inclusion of P tends to be easily obtained. Among M-type ferrites, SrM-type ferrites, LaCo-substituted SrM-type ferrites, LaCo-substituted CaM-type ferrites and the like are suitable.

In the magnet 1, the ferrite magnetic material except for minor constituents (P and other minor constituents described below) is composed of hard ferrite. In view of obtaining sufficient magnetic properties, the content of hard ferrite is preferably 90 to 100% by mass, and more preferably 95 to 100% by mass of the total ferrite magnetic material. Composition of the ferrite magnetic material can be analyzed by fluorescent X-ray quantitative analysis, and the presence of the above main phase can be verified by X-ray diffraction or electron diffraction.

The ferrite magnetic material which constitutes the magnet 1 contains P as a minor constituent other than hard ferrite. P may be contained in the above main phase or in grain boundaries. The ferrite magnetic material may contain a minor constituent other than P in the main phase or grain boundaries in a range that it does not deteriorate the properties.

The ferrite magnetic material may contain, as minor constituents other than P, for example Al and/or Cr. These constituents tend to improve HcJ of the magnet 1. In view of obtaining sufficient improving effect of HcJ, the contents of Al and/or Cr is, in terms of $Al_2O_3$ and $Cr_2O_3$, preferably 0.1% by mass or more of the total ferrite magnetic material. On the other hand, as these constituents may decrease Br of the magnet 1, the contents of these constituents is desirably 3% by mass or less in view of obtaining sufficient Br.

The minor constituents contained may be B as, for example, $B_2O_3$. Inclusion of B can decrease pre-sintering and sintering temperatures for obtaining a sintered body composed of the ferrite magnetic material, thereby improving productivity of the magnet 1. On the other hand, as excess B may decrease the saturation magnetization of the magnet 1, a B content in terms of $B_2O_3$ is preferably 0.5% by mass or less of the total ferrite magnetic material.

The ferrite magnetic material may contain, as minor constituents, oxides of Ga, Mg, Cu, Mn, Ni, Zn, In, Li, Ti, Zr, Ge, Sn, V, Nb, Ta, Sb, As, W, Mo and the like. The contents of these constituents are preferably, in terms of the stoichiometric oxide of each atom, 5% by mass or less gallium oxide, 5% by mass or less magnesium oxide, 5% by mass or less copper oxide, 5% by mass or less manganese oxide, 5% by mass or less nickel oxide, 5% by mass or less zinc oxide, 3% by mass or less indium oxide, 1% by mass or less lithium oxide, 3% by mass or less titanium oxide, 3% by mass or less zirconium oxide, 3% by mass or less germanium oxide, 3% by mass or less tin oxide, 3% by mass or less vanadium oxide, 3% by mass or less niobium oxide, 3% by mass or less tantalum oxide, 3% by mass or less antimony oxide, 3% by mass or less arsenic oxide, 3% by mass or less tungsten oxide and 3% by mass or less molybdenum oxide. When more than one of these constituents is contained, the total content thereof is desirably 5% by mass or less in order to avoid reduction in magnetic properties.

It is preferred that the ferrite magnetic material does not contain alkaline metal elements (Na, K, Rb, etc.) as minor constituents. Alkaline metal elements tend to decrease the saturation magnetization of the magnet 1. However, alkaline metal elements may be contained in, for example, raw materials of ferrite magnetic materials. Such unavoidable inclusion of alkaline metal elements in the ferrite magnetic material may be accepted. The content of alkaline metal elements which does not significantly affect magnetic properties is 3% by mass or less.

The ferrite magnetic material which constitutes the magnet 1 is, as described above, in the form of a sintered body having a structure comprising crystal particles (main phase) and grain boundaries. An average crystal particle diameter of the crystal particles in the sintered body is preferably 1.5 μm or less, more preferably 1.0 μm or less, and still more preferably 0.5 to 1.0 μm. Such average crystal particle diameter makes it possible to obtain high HcJ. The crystal particle diameter of a sintered body of the ferrite magnetic material can be measured by scanning electron microscopy.

Figure 2:
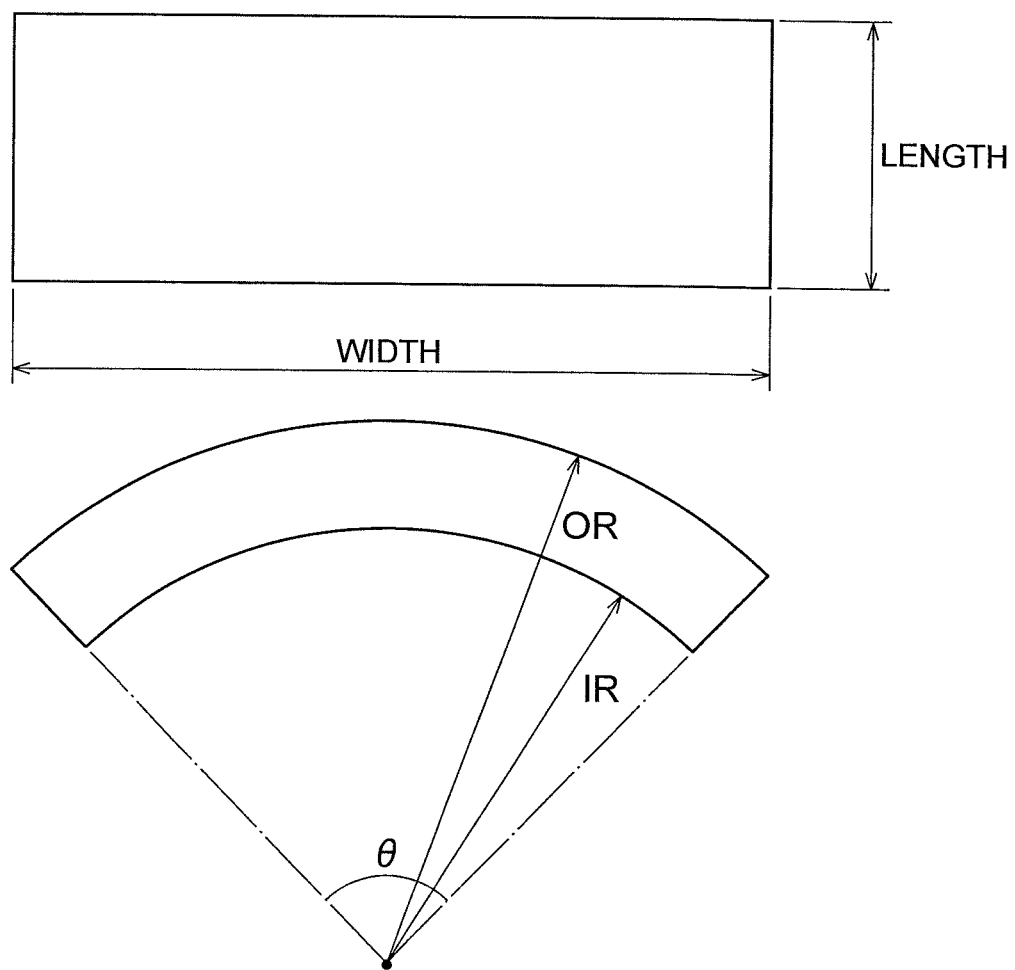
FIG. 2 shows respectively a plan view and an end view of a magnet 1.

The magnet 1 has, as described above, a bent arc segment shape. FIG. 2 is a plan top view and an end side view of the magnet 1. As can be seen from this figure, the magnet 1 has a fan-shaped planar shape having a certain central angle. A central angle of a magnet having an arc segment shape is defined as follows. Namely, the central angle is a central angle formed with the outer circumference of the arc end face of a magnet assuming it is a segment of a circle, which is represented by θ in the end view in FIG. 2. The magnet 1 having such shape generally have a crystal structure oriented such that the magnet is radially anisotropic in the direction of the arrow represented by OR in the end view of FIG. 2.

The magnet 1 is composed of a sintered body of the ferrite magnetic material, which material is especially advantageous for forming the magnet 1 having a certain central angle. Namely, when a ferrite sintered magnet is produced, a sintered body corresponding to a sintered magnet is obtained by preliminarily forming a compact as described below and then sintering the compact. In order to obtain an anisotropic arc segment-shaped sintered body, a compact is used which has been bent into a desired shape.

The compact shrinks at a constant rate upon sintering. When the compact is subjected to magnetic orientation, the degree of shrinkage in the crystal structure in the direction of c-axis (easy axis of magnetization) significantly differs from that in the direction of a-axis, i.e. the degree of shrinkage in the direction of c-axis is generally higher than that in the direction of a-axis. When the crystal structure is oriented in an arc shape, this difference in the degree of shrinkage generally results in shrinkage such that the central angle is further enlarged upon sintering. In order to obtain an anisotropic shape having a desired central angle with having such ratio of the degree of shrinkage in mind, a compact is preliminarily prepared so as to have a shallow arc (having a smaller central angle). The difference in the degree of shrinkage can be represented by a ratio of the degree of shrinkage (degree of shrinkage in c-axis/degree of shrinkage in a-axis). The ratio of the degree of shrinkage is determined mainly according to composition of a ferrite magnetic material. Greater ratio of the degree of shrinkage causes a greater difference between the degrees of shrinkage in the tangential direction and the normal direction of arc, resulting in shrinkage such that the central angle is enlarged.

When a magnet having a deep arc is produced, it is required to prepare a compact having a deep arc. However, in order to obtain a magnet having a central angle of 30° or more, the arc of the compact also needs to be deep, so that an extended molding process or increased molding pressure is required due to insufficient setting at the vicinity of both ends of the compact; this results in severer molding conditions compared to the conventional processes. As a result, productivity tends to be decreased and properties of the resulting magnets also tend to be deteriorated. Due to this reason, it has been rather difficult to prepare anisotropic ferrite sintered magnets having a central angle of 30° or more.

In contrast, as the ferrite magnetic material constituting the magnet 1 of the present embodiment has the above composition, particularly a P content in terms of $P_2O_5$ is 0.001% by mass or more, an effect is provided such that the ratio of the degree of shrinkage of a compact upon sintering is increased. Thus, the ferrite magnetic material can provide a sintered body having a deep arc (having a large central angle) from a compact having a shallow arc due to a high ratio of the degree of shrinkage upon sintering. Accordingly, the magnet 1 having a central angle of 30° or more, and preferably 60° or more can be easily obtained.

The magnet 1 according to a preferred embodiment has been described hereinabove. However, the magnet obtained according to the present invention is not limited to the above embodiment so long as it is composed of the ferrite magnetic material of the present invention. For example, the magnet can have a disc shape, cylindrical shape and the like various shapes in addition to an anisotropic arc segment shape. The magnet, as long as it is composed of the ferrite magnetic material of the present invention, can retain high Br and HcJ while having high Hk/HcJ, even when it has a shape other than an arc segment shape.

The magnet 1 is not limited to the one composed of a sintered body of the above ferrite magnetic material and may be a bond magnet composed of powder of the ferrite magnetic material bonded with a binder.

In this case, it is sufficient that the powder of the ferrite magnetic material meets the above requirements for the ferrite magnetic material. An average particle diameter of the primary particle constituting the powder of the ferrite magnetic material may be, but not limited to, preferably 2 μm or less, more preferably 1 μm or less, and still more preferably 0.1 to 1 μm. If the average particle diameter is too high, the ratio of multi-domain particles in powder may be increased to decrease HcJ. On the other hand, if the average particle diameter is too low, magnetic properties may be decreased due to thermal disturbance or orientation and molding properties may be decreased upon molding in magnetic field.

The binder may include nitrile rubber (e.g. NBR rubber), chlorinated polyethylene, polyamide resins (e.g. Nylon 6®, Nylon 12®) and the like.

(Production Method of Ferrite Permanent Magnet)

A preferred embodiment of a production method of the above ferrite permanent magnet is now described. In the following embodiment, an example of the production method of a ferrite sintered magnet composed of the ferrite magnetic material is provided. In this embodiment, the ferrite sintered magnet can be produced through the steps of mixing, pre-sintering, grinding, molding and sintering. Each step is now described herein below.

<Step of Mixing>

In the step of mixing, raw materials for the ferrite magnetic material are mixed to obtain a raw material composition. The raw material for hard ferrite may include a compound (raw material compound) containing one or more types of elements constituting hard ferrite. The raw material compound is suitably in powder, for example. The raw material compound may include oxides of the respective elements and compounds which can be oxidized by sintering (carbonates, hydroxides, nitrates etc.), examples of which may include $SrCO_3$, $La(OH)_3$, $Pr_6O_{11}$, $Nd_2O_3$, $MnO$, $Fe_2O_3$, $BaCO_3$, $CaCO_3$, $Co_3O_4$ and the like. An average particle diameter of powder of the raw material compound is preferably about 0.1 to 2.0 μm in terms of allowing homogeneous mixing.

The source of P in the ferrite magnetic material is not specifically limited as long as it contains P, and may include P, $P_4O_{10}$, $FePO_4 \cdot nH_2O$ and the like. The raw material powder may optionally include other minor raw material compounds (elemental substances, oxides etc.).

Mixing can be carried out, for example, by weighing each raw materials so as to obtain desired composition of the ferrite magnetic material, mixing them and then mixing and grinding the same in a wet attritor, a ball mill and the like for about 0.1 to 20 hours. In this step, it is not required to mix all the raw materials and some material(s) may be added after pre-sintering as described below.

<Step of Pre-Sintering>

In the step of pre-sintering, powder of the raw material obtained in the step of mixing is pre-sintered. Pre-sintering can be carried out in, for example, oxidative atmosphere such as in air. The temperature of pre-sintering is preferably in the range of 1100 to 1400° C., more preferably 1100 to 1300° C. and still more preferably 1100 to 1250° C. The period of pre-sintering may be 1 second to 10 hours, and preferably 1 second to 3 hours. A pre-sintered body obtained by pre-sintering contains 70% or more of the above main phase (M phase). A primary particle diameter in the main phase is preferably 10 μm or less, and more preferably 2 μm or less.

<Step of Grinding>

In the step of grinding, the pre-sintered body in the form of a grain or bulk obtained in the step of pre-sintering is ground into powder again. By doing this, molding in the step of molding described below is facilitated. In this grinding step, a raw material(s) which has not been added in the step of mixing may be added (post-addition of a raw material(s)). The step of grinding may comprise two steps, i.e. steps of grinding the pre-sintered body into coarse powder (coarse grinding) and further grinding the coarse powder into fine powder (fine grinding).

Coarse grinding can be carried out in, for example, a vibration mill until an average particle diameter of 0.5 to 5.0 μm is obtained. In the step of fine grinding, the coarsely ground material obtained from coarse grinding is further ground in a wet attritor, a ball mill, a jet mill and the like. Fine grinding is carried out so as to obtain an average particle diameter of the resulting finely ground material of preferably 0.08 to 2.0 μm, more preferably 0.1 to 1.0 μm, and still more preferably 0.2 to 0.8 μm. The finely ground material preferably has a specific surface area of around 7 to 12 $m^2/g$ (obtained by, for example, BET method). A suitable period for grinding varies depending on the method of grinding, and is preferably 30 minutes to 10 hours in a wet attritor and about 10 to 50 hours for wet grinding in a ball mill.

When some raw material(s) is added in the step of grinding, it can be added during fine grinding, for example. According to the present embodiment, a Si component, $SiO_2$, or a Ca component, $CaCO_3$, can be added during fine grinding. These may also be added in the step of mixing or in the step of coarse grinding.

It is preferable to add a polyalcohol represented by, for example, a general formula of $C_n(OH)_nH_{n+2}$ in the step of fine grinding in order to improve magnetic orientation of a sintered body obtained after sintering. The polyalcohol is preferably the ones having the general formula wherein n is 4 to 100, more preferably 4 to 30, still more preferably 4 to 20, and further more preferably 4 to 12. The polyalcohol may include, for example, sorbitol. Two or more polyalcohols may be used in combination. Other known dispersing agent may be used in combination with the polyalcohol.

The amount of the polyalcohol added is preferably 0.05 to 5.0% by mass, more preferably 0.1 to 3.0% by mass, and still more preferably 0.2 to 2.0% by mass relative to the target material of addition (e.g. the coarsely ground material). The polyalcohol added in the step of fine grinding is heat-decomposed and removed in the step of sintering described below.

<Step of Molding>

In the step of molding, the ground material obtained from the step of grinding (preferably the finely ground material) is molded in magnetic field to obtain a compact. Molding may be carried out in either dry molding or wet molding. In view of improving magnetic orientation, wet molding is preferred.

In case of wet molding, the above step of fine grinding may be carried out, for example, in a wet mode to obtain a slurry, which is then concentrated to a certain concentration to obtain a slurry for wet molding. Concentration of the slurry can be carried out by centrifugation or filter press. The slurry for wet molding preferably contains 30 to 80% by mass of finely ground material relative to the total amount. A dispersion medium for dispersing the finely ground material in the slurry is preferably water. In this case, a surfactant such as gluconic acid, gluconate, sorbitol and the like may be added to the slurry. The dispersion medium may also be a non-aqueous solvent, which may be an organic solvent such as toluene, xylene and the like. In this case, a surfactant such as oleic acid is preferably added. The slurry for wet molding may also be prepared by adding a dispersion medium and the like to the finely ground material in a dry state obtained from the step of fine grinding.

According to wet molding, the slurry for wet molding is then subjected to molding in magnetic field. The molding pressure is then preferably about 9.8 to 49 MPa (0.1 to 0.5 ton/cm$^2$), and magnetic field applied is preferably about 398 to 1194 kA/m (5 to 15 kOe).

According to the present embodiment, as described above, when a magnet having an arc segment shape is prepared, high ratio of the degree of shrinkage can be obtained in the step of sintering described below because the magnet is composed of the ferrite magnetic material of the present invention. Thus, even when a compact is formed in the step of molding which has a shallower arc (having a smaller central angle) than that of a desired magnet, the magnet having a deep arc can be obtained after sintering.

Preferably, a central angle of a compact is appropriately selected according to composition of the ferrite magnetic material, and can be designed so as to be about 10 to 20% smaller than the central angle of a desired magnet.

<Step of Sintering>

In the step of sintering, the compact obtained from the step of molding is sintered to obtain a sintered body. Accordingly, the magnet 1 composed of the sintered body of the ferrite magnetic material as described above can be obtained. When the magnet having an arc segment shape is prepared, the compact molded so as to have a certain central angle shrinks upon sintering at a certain degree of shrinkage. Accordingly, the resulting sintered body has a smaller central angle than that of the compact. In order to obtain a sintered body having a deep arc, the ratio of the degree of shrinkage upon sintering is preferably 1.0 to 2.5, and more preferably 1.5 to 2.5.

Sintering can be carried out in an oxidative atmosphere such as in air. The temperature of sintering is preferably 1050 to 1270° C., and more preferably 1080 to 1240° C. A period for sintering (a period for maintaining the temperature of sintering) is preferably about 0.5 to 3 hours.

When a compact obtained by wet molding as described above is rapidly heated by sintering without sufficiently drying the compact, cracks may be generated in the compact due to rapid evaporation of a dispersion medium and the like. In order to avoid such problem, it is preferred to gradually heat the compact, before reaching to the above sintering temperature, for example from room temperature to about 100° C. at a temperature elevation rate of about 0.5° C./min in order to dry the compact thoroughly. When a surfactant (dispersing agent) has been added, it is preferred to remove it (defatting treatment) by heating in a temperature range of for example from 100 to 500° C. at a temperature elevation rate of about 2.5° C./min. These treatments may be carried out at the beginning of the step of sintering, or separately from and preliminary to the step of sintering.

A preferred production method of the ferrite sintered magnet has been described; however, the production method is not limited to the above and conditions may be appropriately modified as long as the ferrite magnetic material of the present invention is used.

In order to produce bond magnets instead of ferrite sintered magnets, such bond magnets comprising powder of the ferrite magnetic material of the present invention can be obtained by, for example, carrying out the steps up to the step of grinding as described above, mixing the obtained ground material with a binder and molding the mixture in magnetic field.

EXAMPLES

The present invention is now described in further detail by means of examples, which do not limit the present invention.

Experimental Example 1

Preparation of Ferrite Sintered Magnets

First, iron oxide ($Fe_2O_3$), calcium carbonate ($CaCO_3$), strontium carbonate ($SrCO_3$), cobalt oxide ($Co_3O_4$) and lanthanum hydroxide ($La(OH)_3$) prepared as raw materials for main constituents of ferrite magnetic materials were respectively weighed so as to obtain the following composition formula (main composition) of hard ferrite after sintering. Because cobalt oxide was to be added at the step of fine grinding as well, the amount prepared at this stage was a half amount of the necessary amount to obtain the main composition. Silicon oxide ($SiO_2$) and iron phosphate ($FePO_4.nH_2O$) were also prepared as raw materials for minor constituents. $SiO_2$ was weighed so as to obtain a $SiO_2$ content in the ferrite magnetic materials of 0.69% by mass. The added amount of $FePO_4.nH_2O$ was varied so as to obtain a P content in terms of $P_2O_5$ in the ferrite magnetic materials as shown in Table 1.

Composition formula of main composition: $Ca_{1-w-x}R_w A_x Fe_z M_m O_{19}$;

wherein A=Sr, R=La, M=Co, w=0.40, x=0.15, z=9.53 and m=0.24.

The weighed raw materials were mixed and ground in a wet attritor for 10 minutes to obtain a slurry (step of mixing). The slurry was dried and maintained in air at 1250° C. for 2 hours for pre-sintering (step of pre-sintering).

The obtained pre-sintered powder was coarsely ground in a small rod vibration mill for 10 minutes. To the coarsely ground material were added silicon oxide ($SiO_2$), calcium carbonate ($CaCO_3$) and sorbitol respectively so as to be 0.14% by mass, 1.90% by mass and 0.45% by mass relative to the coarsely ground material. In addition, a remaining half of cobalt oxide left from the step of mixing was added. The obtained mixture was finely ground in a wet ball mill for 37 hours to obtain a slurry (step of grinding).

The solid content of the slurry obtained after fine grinding was adjusted to 73 to 75% to obtain a slurry for wet molding. The slurry for wet molding was molded in a wet magnetic field molding machine with applied magnet field of 796 kA/m (10 kOe) to obtain a cylindrical compact having a diameter of 30 mm and a thickness of 15 mm (step of molding). The obtained compact was thoroughly dried in air at a room temperature and maintained in air at 1200° C. for 1 hour for sintering to obtain a ferrite sintered magnet (step of sintering).

As described above, in the experimental example 1, various ferrite sintered magnets were produced whose P content in terms of $P_2O_5$ varied in the range of 0.0008 to 0.1169.

(Evaluation of Ferrite Sintered Magnet)

First, the degree of shrinkage of the compacts upon sintering of the ferrite sintered magnets prepared in the experimental example 1 was calculated by determining a thickness (shh (%)=100−(thickness of a sintered body/thickness of a compact)×100) and a diameter (shφ (%)=100−(diameter of a sintered body/diameter of a compact)×100), and then calculating therefrom the ratio of the degree of shrinkage between before and after sintering (shh/shφ: c-axis direction/a-axis direction).

The P content of the ferrite sintered magnets obtained in the experimental example 1 was measured with an inductively coupled plasma optical emission spectrometer as the amount of $P_2O_5$.

The upper and lower faces of the cylindrical ferrite sintered magnets obtained in the experimental example 1 were processed and then subjected to a B—H tracer having a maximum applied magnetic field of 955 kA/m (12 kOe) to determine Br and HcJ thereof as well as an external magnetic field strength at 90% of Br (Hk) was measured, based on which Hk/HcJ was determined.

The obtained results are summarized in Table 1.

TABLE 1

| $P_2O_5$ content (mass %) | Br (mT) | HcJ (kA/m) | Hk/HcJ (%) | shh (%) | shφ (%) | shh/shφ |
|---|---|---|---|---|---|---|
| 0.0008 | 468.2 | 359.3 | 81.1 | 28.1 | 14.1 | 1.99 |
| 0.0100 | 468.9 | 395.8 | 86.6 | 27.4 | 13.9 | 1.98 |
| 0.0252 | 466.9 | 404.0 | 84.0 | 27.7 | 13.5 | 2.06 |
| 0.0298 | 467.0 | 404.6 | 89.6 | 27.8 | 13.5 | 2.06 |
| 0.0344 | 465.7 | 400.0 | 87.6 | 27.6 | 13.2 | 2.10 |
| 0.0435 | 466.5 | 400.2 | 86.6 | 27.8 | 13.5 | 2.05 |
| 0.0802 | 467.5 | 394.6 | 90.1 | 27.8 | 13.1 | 2.12 |
| 0.1169 | 453.1 | 343.5 | 94.7 | 28.4 | 12.8 | 2.22 |

According to Table 1, it was confirmed that high Hk/HcJ was obtained when the $P_2O_5$ content was 0.001% by mass or more. Even in these cases, Br and HcJ were sufficiently retained. It was further found that when the amount of $P_2O_5$ was increased, shh/shφ was also increased.

Experimental Example 2

Production of Ferrite Sintered Magnets

First, iron oxide ($Fe_2O_3$), calcium carbonate ($CaCO_3$) and strontium carbonate ($SrCO_3$) prepared as raw materials for main constituents of ferrite magnetic materials were respectively weighed so as to obtain the following composition formula (main composition) of hard ferrite after sintering. Silicon oxide ($SiO_2$) and iron phosphate ($FePO_4 \cdot nH_2O$) were also prepared as raw materials for minor constituents. $SiO_2$ was weighed so as to obtain a $SiO_2$ content in the ferrite magnetic materials of 0.21% by mass. The added amount of $FePO_4 \cdot nH_2O$ was varied so as to obtain a P content in terms of $P_2O_5$ in the ferrite magnetic materials as shown in Table 2.

Composition formula of main composition: $A_{1-w-x}R_wCa_xFe_zM_mO_{19}$;

wherein A=Sr, R=La, M=Co, w=0.127, x=0.116, z=10.36 and m=0.11.

The weighed raw materials were mixed and ground in a wet attritor for 10 minutes to obtain a slurry (step of mixing). The slurry was dried and maintained in air at 1200° C. for 2 hours for pre-sintering (step of pre-sintering).

The obtained pre-sintered powder was coarsely ground in a small rod vibration mill for 10 minutes. To the coarsely ground material were added cobalt oxide ($Co_3O_4$) and lanthanum hydroxide ($La(OH)_3$) respectively weighed so as to obtain the above composition, and silicon oxide ($SiO_2$), calcium carbonate ($CaCO_3$) and sorbitol were added respectively so as to be 0.5% by mass, 1.13% by mass and 0.45% by mass relative to the coarsely ground material. The obtained mixture was finely ground in a wet ball mill for 37 hours to obtain a slurry (step of grinding).

The solid content of the slurry obtained after fine grinding was adjusted to 73 to 75% to obtain a slurry for wet molding. The slurry for wet molding was molded in a wet magnetic field molding machine with applied magnet field of 796 kA/m (10 kOe) to obtain a cylindrical compact having a diameter of 30 mm and a thickness of 15 mm (step of molding). The obtained compact was thoroughly dried in air at a room temperature and maintained in air at 1220° C. for 1 hour for sintering to obtain a ferrite sintered magnet (step of sintering).

As described above, in the experimental example 2, various ferrite sintered magnets were produced whose P content in terms of $P_2O_5$ varied in the range of 0.0008 to 0.1146.

(Evaluation of Ferrite Sintered Magnets)

In a similar manner as the experimental example 1, shh (%), shφ (%), shh/shφ, a P content, Br, HcJ and Hk/HcJ were determined for the ferrite sintered magnets of the experimental example 2. The obtained results are shown in Table 2.

TABLE 2

| $P_2O_5$ content (mass %) | Br (mT) | HcJ (kA/m) | Hk/HcJ (%) | shh (%) | shφ (%) | shh/shφ |
|---|---|---|---|---|---|---|
| 0.0008 | 446.4 | 387.6 | 91.5 | 23.7 | 13.6 | 1.74 |
| 0.0253 | 446.4 | 384.4 | 92.7 | 23.4 | 13.5 | 1.73 |
| 0.0298 | 445.2 | 382.4 | 93.7 | 23.2 | 13.3 | 1.74 |
| 0.0342 | 445.6 | 386.9 | 92.9 | 23.7 | 13.3 | 1.79 |
| 0.0432 | 445.9 | 382.4 | 93.4 | 23.8 | 13.4 | 1.78 |
| 0.0789 | 442.6 | 374.7 | 94.3 | 24.0 | 13.2 | 1.82 |
| 0.1146 | 442.7 | 335.5 | 96.6 | 24.2 | 13.0 | 1.86 |

According to Table 2, it was confirmed that high Hk/HcJ was obtained when the $P_2O_5$ content was 0.001% by mass or more. Even in these cases, Br and HcJ were sufficiently retained. It was further found that when the amount of $P_2O_5$ was increased, shh/shφ was also increased.

Experimental Example 3

Production of Ferrite Sintered Magnets

First, iron oxide ($Fe_2O_3$), calcium carbonate ($CaCO_3$) and strontium carbonate ($SrCO_3$) prepared as raw materials for main constituents of ferrite magnetic materials were respectively weighed so as to obtain the following composition formula (main composition) of hard ferrite after sintering. Iron phosphate ($FePO_4 \cdot nH_2O$) was prepared as a raw material for a minor constituent. The added amount of $FePO_4 \cdot nH_2O$ was varied so as to obtain a P content in terms of $P_2O_5$ in the ferrite magnetic materials as shown in Table 3.

Composition formula of main composition: $A_{1-x}Ca_xFe_zO_{19}$;

wherein, A=Sr, x=0.105 and z=10.20.

The weighed raw materials were mixed and ground in a wet attritor for 10 minutes to obtain a slurry (step of mixing). The slurry was dried and maintained in air at 1200° C. for 2 hours for pre-sintering (step of pre-sintering).

The obtained pre-sintered powder was coarsely ground in a small rod vibration mill for 10 minutes. To the coarsely ground material were added silicon oxide ($SiO_2$), calcium carbonate ($CaCO_3$) and sorbitol respectively so as to be 0.86% by mass, 1.04% by mass and 0.45% by mass. The obtained mixture was finely ground in a wet ball mill for 39 hours to obtain a slurry (step of grinding).

The solid content of the slurry obtained after fine grinding was adjusted to 73 to 75% to obtain a slurry for wet molding. The slurry for wet molding was molded in a wet magnetic field molding machine with applied magnet field of 796 kA/m (10 kOe) to obtain a cylindrical compact having a diameter of 30 mm and a thickness of 15 mm (step of molding). The obtained compact was thoroughly dried in air at a room temperature and maintained in air at 1220° C. for 1 hour for sintering to obtain a ferrite sintered magnet (step of sintering).

As described above, in the experimental example 3, various ferrite sintered magnets were produced whose P content in terms of $P_2O_5$ varied in the range of 0.0008 to 0.1158.

(Evaluation of Ferrite Sintered Magnets)

In a similar manner as the experimental example 1, shh (%), shφ (%), shh/shφ, a P content, Br, HcJ and Hk/HcJ were determined for the ferrite sintered magnets of the experimental example 3. The obtained results are shown in Table 3.

TABLE 3

| $P_2O_5$ content (mass %) | Br (mT) | HcJ (kA/m) | Hk/HcJ (%) | shh (%) | shφ (%) | shh/shφ |
|---|---|---|---|---|---|---|
| 0.0008 | 424.6 | 296.0 | 93.1 | 19.3 | 13.9 | 1.39 |
| 0.0252 | 427.7 | 284.0 | 93.8 | 21.0 | 14.1 | 1.49 |
| 0.0261 | 429.1 | 287.5 | 94.3 | 20.7 | 13.6 | 1.53 |
| 0.0299 | 429.5 | 279.8 | 95.5 | 20.9 | 13.2 | 1.58 |
| 0.0343 | 431.5 | 272.5 | 96.1 | 22.2 | 13.8 | 1.61 |
| 0.0801 | 428.7 | 248.0 | 96.4 | 27.8 | 13.1 | 2.12 |
| 0.1158 | 419.7 | 219.0 | 96.0 | 28.4 | 12.8 | 2.22 |

According to Table 3, it was confirmed that high Hk/HcJ was obtained when the $P_2O_5$ content was 0.001% by mass or more. Even in these cases, Br and HcJ were sufficiently maintained. It was further found that when the amount of $P_2O_5$ was increased, shh/shφ was also increased.

Experimental Example 4

Production of Ferrite Sintered Magnet

First, iron oxide ($Fe_2O_3$), calcium carbonate ($CaCO_3$), strontium carbonate ($SrCO_3$) and strontium sulfate ($SrSO_4$) were prepared as raw materials for main constituents of ferrite magnetic materials. $Fe_2O_3$, $CaCO_3$ and $SrCO_3$ were respectively weighed so as to obtain the following composition formula (main composition) of hard ferrite after sintering. The amount of $SrSO_4$ was varied so as to obtain a S content in the ferrite sintered magnets as shown in Table 4.

Composition formula of main composition: $A_{1-w-x}R_w$-$Ca_xFe_zM_mO_{19}$;

wherein A=Sr, R=La, M=Co, w=0.127, x=0.116, z=10.36 and m=0.11.

The weighed raw materials were mixed and ground in a wet attritor for 10 minutes to obtain a slurry (step of mixing). The slurry was dried and maintained in air at 1200° C. for 2 hours for pre-sintering (step of pre-sintering).

The obtained pre-sintered powder was coarsely ground in a small rod vibration mill for 10 minutes. To the coarsely ground material were added cobalt oxide ($Co_3O_4$) and lanthanum hydroxide ($La(OH)_3$) respectively weighed so as to obtain the above composition, and silicon oxide ($SiO_2$), calcium carbonate ($CaCO_3$) and sorbitol were added respectively so as to be 0.5% by mass, 1.13% by mass and 0.45% by mass relative to the coarsely ground material. The obtained mixture was finely ground in a wet ball mill for 37 hours to obtain a slurry (step of grinding).

The solid content of the slurry obtained after fine grinding was adjusted to 73 to 75% to obtain a slurry for wet molding. The slurry for wet molding was molded in a wet magnetic field molding machine with applied magnet field of 796 kA/m (10 kOe) to obtain a cylindrical compact having a diameter of 30 mm and a thickness of 15 mm (step of molding). The obtained compact was thoroughly dried in air at a room temperature and maintained in air at 1220° C. for 1 hour for sintering to obtain a ferrite sintered magnet (step of sintering).

As described above, in the experimental example 4, various ferrite sintered magnets were produced whose S content varied in the range of 0.0060 to 0.1180.

(Evaluation of Ferrite Sintered Magnets)

In a similar manner as the experimental example 1, shh (%), shφ (%), shh/shφ, Br, HcJ and Hk/HcJ were determined for the ferrite sintered magnets of the experimental example 4. In addition, the S content of the ferrite sintered magnets was measured with an inductively coupled plasma optical emission spectrometer. The results are shown in Table 4.

TABLE 4

| S content (mass %) | Br (mT) | HcJ (kA/m) | Hk/HcJ (%) | shh (%) | shφ (%) | shh/shφ |
|---|---|---|---|---|---|---|
| 0.0060 | 453.3 | 359.5 | 91.7 | 23.7 | 14.0 | 1.70 |
| 0.0180 | 448.0 | 374.1 | 90.8 | 23.3 | 13.6 | 1.71 |
| 0.0430 | 443.6 | 390.7 | 88.3 | 23.7 | 13.4 | 1.76 |
| 0.0680 | 440.9 | 396.8 | 89.5 | 23.7 | 12.8 | 1.85 |
| 0.1180 | 437.4 | 391.2 | 91.2 | 24.1 | 12.3 | 1.96 |

As shown in Table 4, increased S content in the ferrite magnetic materials did not improve Hk/HcJ, verifying that the S content has different characteristics from those of P on Hk/HcJ. There was a tendency that shh/shφ was increased with increased S content.

Experimental Example 5

The ferrite sintered magnets having an arc segment shape as shown in FIG. 1 were prepared with the ferrite magnetic materials having a P content of 0.0008% by mass and 0.0802% by mass obtained from the experimental example 1, respectively. Specifically, the ferrite sintered magnets were obtained in a similar manner as the experimental example 1 except that the slurries for wet molding were molded so as to obtain the magnets having an arc segment shape. In this experimental example 5, the dimensions of the compacts for both ferrite magnetic materials were adjusted respectively so as to obtain the same dimensions of the sintered body shown in Table 5. The dimensions of the compacts required to obtain the same dimensions of the sintered body for the respective ferrite magnetic materials are shown in Table 5. In Table 5, OR, IR, width and length are the dimensions shown in FIG. 2, respectively.

TABLE 5

| Respective dimensions | | Dimensions of sintered body | $P_2O_5$ 0.0008 mass % shh/shφ 1.98 | | $P_2O_5$ 0.08 mass % shh/shφ 2.22 | |
|---|---|---|---|---|---|---|
| | | | shφ(%) 13.9 | shh(%) 27.4 | shφ(%) 12.8 | shh(%) 28.4 |
| | | | Dimensions of compact | | | |
| OR | (mm) | 42.53 | 58.59 | | 59.40 | |
| IR | (mm) | 33.86 | 46.66 | | 47.30 | |
| Width | (mm) | 21.90 | 25.51 | | 25.20 | |
| Length | (mm) | 26.34 | 30.59 | | 30.20 | |
| Central angle | (°) | 29.8 | 25.1 | | 24.5 | |

As shown in Table 5, it was verified that in order to obtain sintered bodies having the same dimensions, a compact having a smaller central angle can be used when the ferrite magnetic material thereof has higher P content and higher shh/shφ.

Experimental Example 6

The same two types of ferrite magnetic materials as the experimental example 5 were used except that the dimensions of the sintered bodies to be obtained were changed as shown in Table 6 to determine the dimensions of the respective compacts required to obtain the same dimensions of the sintered body. The obtained results are shown in Table 6.

TABLE 6

| Respective dimensions | | Dimensions of sintered body | $P_2O_5$ 0.0008 mass % shh/shφ 1.98 | | $P_2O_5$ 0.08 mass % shh/shφ 2.22 | |
|---|---|---|---|---|---|---|
| | | | shφ(%) 13.9 | shh(%) 27.4 | shφ(%) 12.8 | shh(%) 28.4 |
| | | | Dimensions of compact | | | |
| OR | (mm) | 44.50 | 61.31 | | 62.15 | |
| IR | (mm) | 33.90 | 46.71 | | 47.35 | |
| Width | (mm) | 43.26 | 50.86 | | 50.30 | |
| Length | (mm) | 43.62 | 50.64 | | 50.00 | |
| Central angle | (°) | 58.2 | 49.0 | | 47.7 | |

As shown in Table 6, it was verified that in order to obtain sintered bodies having the same dimensions, a compact having a smaller central angle can be used when the ferrite magnetic material thereof has higher P content and higher shh/shφ.

Experimental Example 7

The same two types of ferrite magnetic materials as the experimental example 5 were used except that the dimensions of the sintered bodies to be obtained were changed as shown in Table 7 to determine the dimensions of the respective compacts required to obtain the same dimensions of the sintered body. The sintered bodies were produced 10000 times from the respective ferrite magnetic materials to determine the frequency of crack production in the sintered bodies and the average period of time required to fill a metal mold with the slurry for wet molding in the step of molding. The obtained results are shown in Table 7.

TABLE 7

| Respective dimensions | | Dimensions of sintered body | $P_2O_5$ 0.0008 mass % shh/shφ 1.98 | | $P_2O_5$ 0.08 mass % shh/shφ 2.22 | |
|---|---|---|---|---|---|---|
| | | | shφ(%) 13.9 | shh(%) 27.4 | shφ(%) 12.8 | shh(%) 28.4 |
| | | | Dimensions of compact | | | |
| OR | (mm) | 16.82 | 23.18 | | 23.50 | |
| IR | (mm) | 14.46 | 19.93 | | 20.20 | |
| Width | (mm) | 30.74 | 38.26 | | 38.10 | |
| Length | (mm) | 27.83 | 32.31 | | 31.90 | |
| Central angle | (°) | 132.0 | 111.2 | | 108.3 | |
| Evaluations of cracks and fill time | | | | | | |
| Cracks | (number) | | 101/10000 | | 93/10000 | |
| Fill time | (sec) | | 5.2 | | 5.1 | |

As shown in Table 7, it was verified that in order to obtain sintered bodies having the same dimensions, a compact having a smaller central angle can be used when the ferrite magnetic material thereof has higher P content and higher shh/shφ. In addition, it was found that the ferrite magnetic material having higher P content and higher shh/shφ can reduce production of cracks in sintered bodies having a greater central angle and can reduce the fill time during molding.

EXPLANATION OF REFERENCE NUMERALS

1 Magnet.

The invention claimed is:

1. A ferrite sintered magnet composed of a sintered body of a ferrite magnetic material, wherein the ferrite magnetic material comprises hard ferrite and a phosphorus (P) content, characterized in that the P content in terms of $P_2O_5$ is 0.005 to 0.1% by mass, wherein the hard ferrite comprises LaSrCo-substituted Ca magnetoplumbite-type ferrite.

2. The ferrite sintered magnet according to claim 1, wherein the P content in terms of $P_2O_5$ is 0.005 to 0.08% by mass.

3. The ferrite sintered magnet according to claim 1, wherein the sintered body has an arc segment shape having a central angle, wherein the central angle is 60° or more.

4. The ferrite sintered magnet according to claim 1, wherein the hard ferrite comprises LaSrCo-substituted Ca magnetoplumbite-type ferrite having the formula $Ca_{1-w-x}La_wSr_xFe_zCo_mO_{19}$, wherein w=0.40, x=0.15, z=9.53 and m=0.24.

5. The ferrite sintered magnet according to claim 1, wherein the hard ferrite comprises LaCaCo-substituted Sr magnetoplumbite-type ferrite having the formula $Sr_{1-w-x}La_wCa_xFe_zCo_mO_{19}$, wherein w=0.127, x=0.116, z=10.36 and m=0.11.

6. The ferrite sintered magnet according to claim 1, wherein the LaSrCo-substituted Ca magnetoplumbite-type ferrite has residual magnetic flux density (Br) of 465.7 mT to 468.9 mT, coercive force (HcJ) of 394.6 kA/m to 404.6 kA/m, and a ratio of external magnetic field strength at 90% of Br (Hj) to HcJ (squareness ratio) of 84.0% to 90.1%.

7. The ferrite sintered magnet according to claim 6, wherein the ferrite magnetic material has shrinkage in the c-axis direction before and after sintering and shrinkage in the a-axis direction before and after sintering, wherein the ratio of the degree of shrinkage in the c-axis direction before and after sintering to the degree of shrinkage in the a-axis direction before and after sintering (shh/shφ) is 1.98 to 2.12.

8. The ferrite sintered magnet according to claim 1, wherein the hard ferrite comprises LaCaCo-substituted Sr magnetoplumbite-type ferrite, wherein the LaCaCo-substituted Sr magnetoplumbite-type ferrite has residual magnetic flux density (Br) of 442.6 mT to 446.4 mT, coercive force (HcJ) of 374.7 kA/m to 386.9 kA/m, and a ratio of external magnetic field strength at 90% of Br (Hj) to HcJ (squareness ratio) of 92.7% to 94.3%.

9. The ferrite sintered magnet according to claim 8, wherein the ferrite magnetic material has shrinkage in the c-axis direction before and after sintering and shrinkage in the a-axis direction before and after sintering, wherein the ratio of the degree of shrinkage in the c-axis direction before and after sintering to the degree of shrinkage in the a-axis direction before and after sintering ($sh_h/sh_\phi$) is 1.73 to 1.82.

* * * * *